United States Patent
Zhu et al.

(10) Patent No.: US 12,492,269 B2
(45) Date of Patent: Dec. 9, 2025

(54) PHOTOCURABLE COMPOSITION, LIGHT CONDENSING LAYER, AND DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventors: Qinfu Zhu, Guangdong (CN); Xiaosa Gao, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 411 days.

(21) Appl. No.: 18/148,840

(22) Filed: Dec. 30, 2022

(65) Prior Publication Data
US 2024/0174773 A1     May 30, 2024

(30) Foreign Application Priority Data
Nov. 30, 2022 (CN) .......................... 202211526605.5

(51) Int. Cl.
| | |
|---|---|
| C08F 2/46 | (2006.01) |
| C08F 2/50 | (2006.01) |
| C08F 220/30 | (2006.01) |
| C08F 222/10 | (2006.01) |
| C08G 61/04 | (2006.01) |
| C08K 3/22 | (2006.01) |
| C08K 9/04 | (2006.01) |
| G02F 1/13357 | (2006.01) |
| G03F 7/004 | (2006.01) |

(52) U.S. Cl.
CPC ............ *C08F 2/50* (2013.01); *C08F 220/301* (2020.02); *C08F 222/104* (2020.02); *C08K 3/22* (2013.01); *C08K 9/04* (2013.01); *G02F 1/133606* (2013.01); *G03F 7/004* (2013.01); *C08K 2003/222* (2013.01); *C08K 2003/2241* (2013.01); *C08K 2003/2244* (2013.01); *C08K 2201/011* (2013.01)

(58) Field of Classification Search
CPC ...... C08F 2/48; C08F 2/44; C08F 2/50; C08F 222/104; C08F 220/301; C08K 3/22; C08K 9/04; C08K 2201/011; C08K 2003/2241; C08K 2003/2244; C08K 2003/222; G02F 1/133606; C08L 33/08
USPC ................ 522/33, 6, 189, 184, 71, 1; 520/1
See application file for complete search history.

(56) References Cited

U.S. PATENT DOCUMENTS

| | | | |
|---|---|---|---|
| 2003/0021566 A1* | 1/2003 | Shustack ............... | B82Y 30/00 252/582 |
| 2008/0038561 A1* | 2/2008 | Yoshizawa ........... | C09D 133/16 428/411.1 |
| 2020/0041696 A1 | 2/2020 | Seo et al. | |

FOREIGN PATENT DOCUMENTS

| | | | | |
|---|---|---|---|---|
| CN | 103732203 B | * | 5/2017 | ........... A61C 19/003 |
| CN | 108152847 A | | 6/2018 | |
| CN | 112382648 A | | 2/2021 | |
| CN | 114203929 A | | 3/2022 | |
| JP | 2005316219 A | | 11/2005 | |
| JP | 2019006984 A | | 1/2019 | |

OTHER PUBLICATIONS

Joly et al, CN 103732203 Machine Translation, May 3, 2017 (Year: 2017).*
Chinese Office Action issued in corresponding Chinese Patent Application No. 202211526605.5 dated Sep. 7, 2023, pp. 1-6.
Chinese Office Action issued in corresponding Chinese Patent Application No. 202211526605.5 dated May 20, 2024, pp. 1-6.
Chinese Office Action issued in corresponding Chinese Patent Application No. 202211526605.5 dated Sep. 27, 2024, pp. 1-9.
Journal of Yunnan Normal University vol. 33 Issue 4 Jul. 31, 2013 The Impact of the Condenser Mirror's Parameters of Solar Trough Reflector on the Concentrating Characteristics Ying Zhang, etc.

* cited by examiner

*Primary Examiner* — Jessica Whiteley
(74) *Attorney, Agent, or Firm* — PV IP PC; Christopher S. Ruprecht; Wei Te Chung (57) ABSTRACT

The present disclosure provides a photocurable composition, a light condensing layer, and a display device. The photocurable composition includes an acrylic resin, a photoinitiator, and a nanoparticle composite. Raw materials for preparing the nanoparticle composite include an inorganic nanoparticle, a surface of which is provided with active hydroxyl groups, and an organic compound including at least one of a titanate coupling agent and a zirconate coupling agent.

20 Claims, 4 Drawing Sheets

PHOTOCURABLE COMPOSITION, LIGHT CONDENSING LAYER, AND DISPLAY DEVICE

TECHNICAL FIELD

The present disclosure relates to the technical field of display, in particular to a photocurable composition, a light condensing layer, and a display device.

BACKGROUND

With increase of sizes and improvement of resolution of display panels, the display panels with great brightness are a main direction of development in display industry. However, in the prior art, display brightness of the display panels is not enough to meet application requirements of market.

Therefore, how to improve the display brightness of the display panels is a technical problem to be solved.

SUMMARY

A purpose of the present disclosure is to provide a photocurable composition, a light condensing layer, and a display device, so as to improve display brightness of the display device at a positive viewing angle and a viewing angle deviating from the positive viewing angle within a certain range.

In a first aspect, the present disclosure provides a photocurable composition, including:
  an acrylic resin;
  a photoinitiator; and
  a nano-particle composite, wherein raw materials for preparing the nano-particle composite include:
    an inorganic nano-particle, wherein a surface of the inorganic nano-particle is provided with active hydroxyl groups; and
    an organic compound, wherein the organic compound includes at least one of a titanate coupling agent and a zirconate coupling agent.

In some embodiments of the photocurable composition, a ratio of a mass of the inorganic nano-particle to a mass of the organic compound is (1 to 2):(0.1 to 5).

In some embodiments of the photocurable composition, the organic compound is represented by a formula of $(R_1O)_nM(OCOR_2)_{4-n}$, wherein n is greater than or equal to 1 and is less than or equal to 3, $R_1$ independently at each occurrence represents an alkyl group, at least one $R_2$ includes at least one of a carbon-carbon double bond, an amino group, and a mercapto group, and M is Ti or Zr.

In some embodiments of the photocurable composition, the organic compound includes at least one of isopropyl trioleyl titanate, isopropoxy tri (ethylenediamino-N-ethoxy) titanate, isopropoxy tri (3-mercaptopropionic acid) titanate, and dialkyloxy bis (4-aminobenzoyl) zirconate.

In some embodiments of the photocurable composition, a ratio of a mass of the acrylic resin to a mass of the nano-particle composite is (3 to 20):(1 to 10).

In some embodiments of the photocurable composition, the photocurable composition further includes:
  a refractive index regulating monomer, wherein a refractive index of the refractive index regulating monomer is greater than a refractive index of the acrylic resin, and a ratio of a mass of the acrylic resin to a mass of the refractive index regulating monomer is (3 to 20):(3 to 15).

In some embodiments of the photocurable composition, the refractive index regulating monomer includes at least one of 2-acrylic acid 2-([1,1'-biphenyl]-2-oxy) ethyl ester, 9,9-bis [4-(2-acryloyloxy) phenyl] fluorene diacrylate, acrylic acid 2-phenoxy ethyl ester, and tetraphenyl methacrylate.

In some embodiments of the photocurable composition, the photocurable composition further includes an antifouling additive, and a ratio of the acrylic resin, the antifouling additive, and the photoinitiator is (3 to 20):(0.1 to 1):(0.3 to 2) by mass.

In some embodiments of the photocurable composition, the inorganic nano-particle includes at least one of titanium dioxide, zirconium dioxide, and magnesium oxide.

In a second aspect, the present disclosure provides a light condensing layer, including:
  a microstructure layer, wherein the microstructure layer includes microstructures, and the microstructure layer is prepared from any one of the above-mentioned photocurable compositions; and
  a light transmitting covering layer, wherein the light transmitting covering layer covers the microstructures, and a refractive index of the light transmitting covering layer is less than a refractive index of the microstructure layer.

In some embodiments of the light condensing layer, the light transmitting covering layer includes an organic layer.

In some embodiments of the light condensing layer, the light transmitting covering layer is an air layer.

In some embodiments of the light condensing layer, a cross-sectional shape of the microstructures includes at least one of a semicircle, a triangle, and a trapezoid in a thickness direction of the light condensing layer.

In a third aspect, the present disclosure provides a display device, including:
  a display panel, wherein the display panel includes display units; and
  the light condensing layer as described in any of the above embodiments, wherein the light condensing layer is located on a light output side of the display panel, a part of the light transmitting covering layer covering the microstructures is located on a side of the microstructures away from the display panel, and the microstructures overlap the display units.

Beneficial effects of the present disclosure: since a refractive index of the titanate coupling agent and a refractive index of the zirconate coupling agent are both greater than a refractive index of a conventional silane coupling agent, after the organic compound including at least one of the titanate coupling agent and the zirconate coupling agent reacts with the active hydroxyl groups of the inorganic nano-particle to prepare nano-particle composite, spatial steric resistance of the prepared nano-particle composite increases due to an inclusion of organic chain segments, thereby improving an agglomeration problem of inorganic nano-particles; the nano-particle composite can be more evenly dispersed in the acrylic resin, and furthermore the selection of the titanate coupling agent and the zirconate coupling agent can ensure that the nano-particle composite including the organic chain segments has a greater refractive index, thus ensuring that the microstructure of the light condensing layer prepared by the photocurable composition has a greater refractive index.

In addition, the refractive index of the microstructure is greater than the refractive index of the light transmitting covering layer, so that oblique light emitted by the display units of the display panel narrows after passing through the microstructure. That is, the oblique light emitted by the display panel converges towards a direction perpendicular to a positive viewing angle of a light output surface of the display device after passing through the light condensing layer, which improves a light output rate of the display device, and improves display brightness of the display device at a positive viewing angle and a viewing angle deviating from the positive viewing angle within a certain range. In addition, the nano-particle composite can be more evenly dispersed in the acrylic resin, which can reduce a scattering effect of inorganic nano-particles in the microstructure on light emitted by the display units, thus ensuring a focusing effect of the light condensing layer on the light emitted by the display units, further improving the light output rate of the display device, and further improving the display brightness of the display device at the positive viewing angle and the viewing angle deviating from the positive viewing angle within the certain range.

DETAILED DESCRIPTION OF THE EMBODIMENT

Technical solutions in the embodiments of the present disclosure will be described in combination with drawings in the embodiments of the present disclosure clearly and completely. Obviously, the described embodiments are only part of the embodiments of the present disclosure, not all of them. Based on the embodiments in the present disclosure, all other embodiments obtained by those skilled in the art without creative work belong to a scope of protection in the present disclosure.

Figure 1:
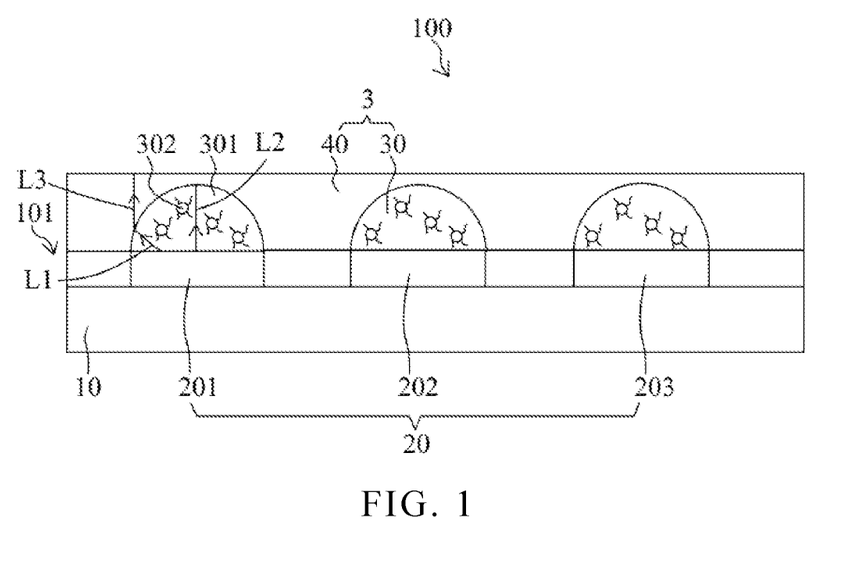
FIG. 1 is a schematic sectional diagram of a display device provided by an embodiment of the present disclosure.

Referring to FIG. 1, FIG. 1 is a schematic sectional diagram of a display device provided by an embodiment of the present disclosure. A display device 100 includes a display panel 101 and a light condensing layer 3. The light condensing layer 3 is located on a light output side of the display panel 101.

In the embodiment, the display panel 101 includes a substrate 10 and a plurality of display units 20 arranged on the substrate 10 in an array. Light emitted by the plurality of display units 20 includes first light L1 emitted obliquely and second light L2 emitted perpendicularly. An included angle between the first light L1 and a normal line of a light output surface of the display panel 101 is greater than 0° and less than 90°. The second light L2 is parallel to the normal line of the light output surface of the display panel 101.

In the embodiment, the plurality of display units 20 include a first display unit 201, a second display unit 202, and a third display unit 203. The first display unit 201, the second display unit 202, and the third display unit 203 emit light with different colors.

Specifically, the first display unit 201 is configured to emit red light, the second display unit 202 is configured to emit green light, and the third display unit 203 is configured to emit blue light.

In the embodiment, the first display unit 201, the second display unit 202, and the third display unit 203 are all organic light-emitting diodes.

It can be understood that in other embodiments, the first display unit 201, the second display unit 202, and the third display unit 203 may be micro light-emitting diodes (Micro LEDs) or submillimeter light-emitting diodes (Mini LEDs).

In the embodiment, the light condensing layer 3 has a light condensing function. The light condensing layer 3 is configured to narrow an angle of large angle outgoing light emitted by the display units 20, and increase a proportion of small angle outgoing light in total angle outgoing light.

In the embodiment, the light condensing layer 3 includes a microstructure layer 30 and a light transmitting covering layer 40. The microstructure layer 30 includes a plurality of microstructures 301 arranged in an array. A gap is defined between two adjacent microstructures 301. A bottom surface of a microstructure 301 faces the display units 20. The microstructure 301 includes an inclined sidewall. The inclined sidewall of the microstructure 301 is connected to the bottom surface of the microstructure 301. An included angle between the inclined sidewall of the microstructure 301 and the bottom surface of the microstructure 301 is greater than 0° and less than 90°. In some embodiments, the included angle between the inclined sidewall of the microstructure 301 and the bottom surface of the microstructure 301 is 20°, 30°, 40°, 50°, 60°, 70°, 80°, or 85°.

In the embodiment, a cross-sectional shape of the microstructure 301 includes at least one of a semicircle, a triangle, and a trapezoid in a thickness direction of the light condensing layer 3.

In the embodiment, a shape of the microstructure 301 includes at least one of a hemisphere, a prism, a pyramid, and a bevel. The prism includes but is not limited to a trigonal prism, a quadrangular prism, a pentagonal prism, and semicylinder. The pyramid includes but is not limited to a trigonal pyramid, a quadrangular pyramid, and a pentagonal pyramid. The bevel includes but is not limited to a trigonal bevel, a quadrangular bevel, and a pentagonal bevel.

Specifically, in the embodiment, the shape of the microstructure 301 is hemispherical. In the thickness direction of the light condensing layer 3, the cross-sectional shape of the microstructure 301 is semicircular, and the inclined sidewall of the microstructure 301 is an inclined arc surface, as shown in FIG. 1.

Figure 2:
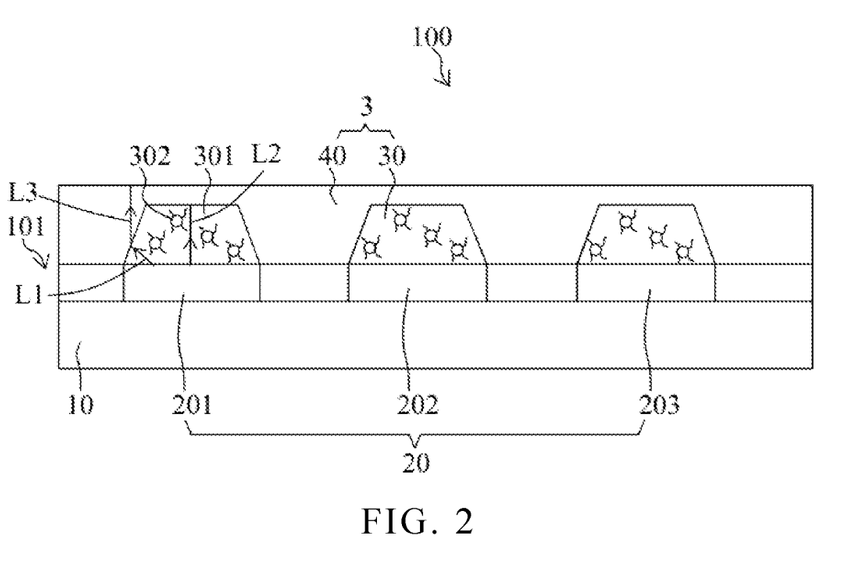
FIG. 2 is a schematic sectional diagram of a display device provided by another embodiment of the present disclosure.

In another embodiment, the shape of the microstructure 301 is a quadrangular prism. In the thickness direction of the light condensing layer 3, the cross-sectional shape of the microstructure 301 is trapezoidal, and the inclined sidewall of the microstructure 301 is an inclined plane, as shown in FIG. 2.

Figure 3:
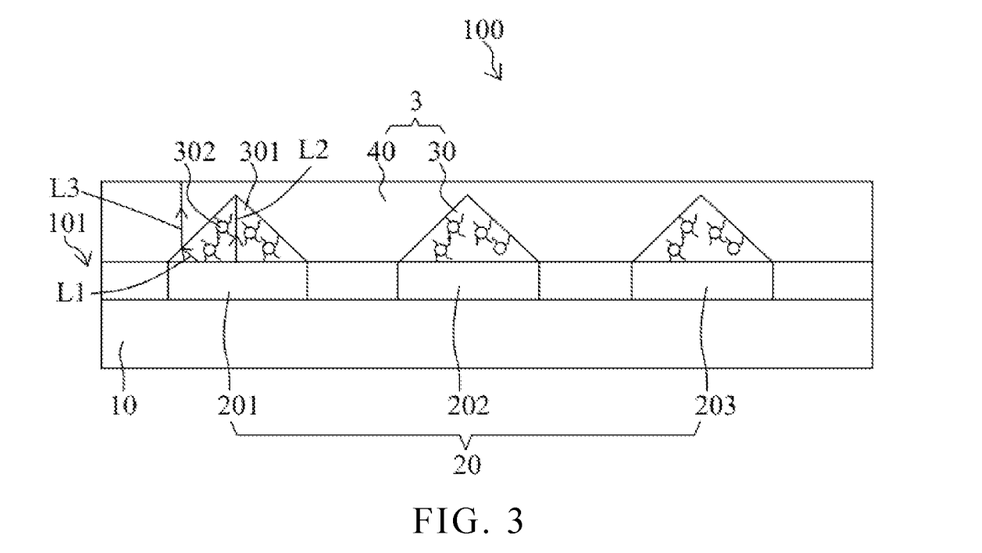
FIG. 3 is a schematic sectional diagram of a display device provided by another embodiment of the present disclosure.

In another embodiment, the shape of the microstructure 301 is a trigonal pyramid. In the thickness direction of the light condensing layer 3, the cross-sectional shape of the microstructure 301 is a triangle, and the inclined sidewall of the microstructure 301 is an inclined plane, as shown in FIG. 3.

In the embodiment, one microstructure 301 overlaps at least a part of the at least one display unit 20.

It can be understood that one microstructure 301 overlaps at least a part of the at least one display unit 20 includes following situations: one microstructure 301 overlaps a part of one display unit 20, one microstructure 301 completely covers one display unit 20, one microstructure 301 overlaps parts of the plurality of display units 20, or one microstructure 301 completely covers the plurality of display units 20.

It should be noted that when one microstructure 301 completely covers one display unit 20, an orthographic projection of one microstructure 301 on the substrate 10 completely covers an orthographic projection of one display unit 20 on the substrate 10. Similarly, when one microstructure 301 completely covers the plurality of display units 20, the orthographic projection of one microstructure 301 on the substrate 10 completely covers orthographic projections of the plurality of display units 20 on the substrate 10.

Specifically, in the embodiment, the plurality of microstructures 301 shown in FIG. 1 are arranged in a two-dimensional array, and one microstructure 301 covers one display unit 20.

It should be noted that when the shape of the microstructure 301 is hemisphere, pyramid, or bevel, the plurality of microstructures 301 are arranged in a two-dimensional array. The plurality of microstructures 301 and the plurality of display units 20 are arranged in one-to-one correspondence, and each microstructure 301 covers a corresponding display unit 20. When the shape of the microstructure 301 is prism, the plurality of microstructures 301 are arranged in a one-dimensional array, one microstructure 301 is disposed corresponding to a row of the display units 20, and one microstructure 301 covers the corresponding row of the display units 20.

In the embodiment, the light transmitting covering layer 40 covers the plurality of microstructures 301 and the display panel 101. A part of the light transmitting covering layer 40 covering the microstructure 301 is located on a side of the microstructure 301 away from the display panel 101. A refractive index of the light transmitting covering layer 40 is less than a refractive index of the microstructure layer 30.

Because the refractive index of the light transmitting covering layer 40 is less than the refractive index of the microstructure layer 30, due to a difference in refractive index, after the first light L1 emitted obliquely from the display unit 20 is incident to the microstructure 301, a part of the first light L1 is refracted on the inclined sidewall of the microstructure 301 and becomes third light L3 incident to the light transmitting covering layer 40. An exit angle of the third light L3 is less than the exit angle of the first light L1, that is to say, part of the oblique outgoing light emitted by the display panel 101 converges towards a direction perpendicular to a positive viewing angle of the light output surface of the display device after passing through the light condensing layer 3, so as to improve a light output rate of the display device and display brightness of the display device at the positive viewing angle and a viewing angle deviating from the positive viewing angle within a certain range.

In addition, the design of the plurality of microstructures 301 enables a greater contact surface between the light transmitting covering layer 40 and the plurality of microstructures 301. More parts of the oblique outgoing light emitted by the display panel 101 can converge towards the direction of the positive viewing angle of the display device, thus improving the display brightness of the display device at the positive viewing angle and the viewing angle deviating from the positive viewing angle within a certain range.

In the embodiment, the refractive index of the microstructure 301 is greater than or equal to 1.5, which is conducive to improving the light output rate of the light emitted by the display units 20 and passing through the microstructure 301 in the microstructure 301.

Further, the refractive index of the microstructure 301 is less than or equal to 2, so as to avoid excessive refractive index of the microstructure 301 and reduce the light emitted by the display units 20 and incident on the microstructure 301.

Specifically, the refractive index of the microstructure 301 is greater than or equal to 1.55 and less than or equal to 1.8. For example, the refractive index of the microstructure 301 may be 1.55, 1.6, 1.7, 1.8, 1.9, or 2.0.

In the embodiment, the microstructure layer 30 is prepared from a photocurable composition. The photocurable composition includes an acrylic resin, a photoinitiator, and a nano-particle composite 302.

In the embodiment, after active free radicals are formed by the photoinitiator under ultraviolet irradiation, the acrylic resin polymerizes under an initiation of the active free radicals to form a three-dimensional network cross-linked structure, which provides basic physical and mechanical properties for the microstructure 301.

The acrylic resin includes at least one of dipentaerythritol hexaacrylate (DPHA), dipentaerythritol pentaacrylate, pentaerythritol triacrylate, trimethylolpropane triacrylate, and di trimethylolpropane tetraacrylate (Di TMPTA).

The photoinitiator include one or more of 2-hydroxy-2-methyl-1-phenyl-1-propanone, 2,4,6-trimethylbenzoyl diphenylphosphine oxide (TPO), 1-hydroxycyclohexylphenyl ketone, 2-phenylbenzyl-2-dimethylamino-1-(4-morpholinbenzylphenyl) butanone, and 2-hydroxy-2-methyl-1-[4-(2-hydroxyethoxy) phenyl]-1-propanone.

Figure 4:
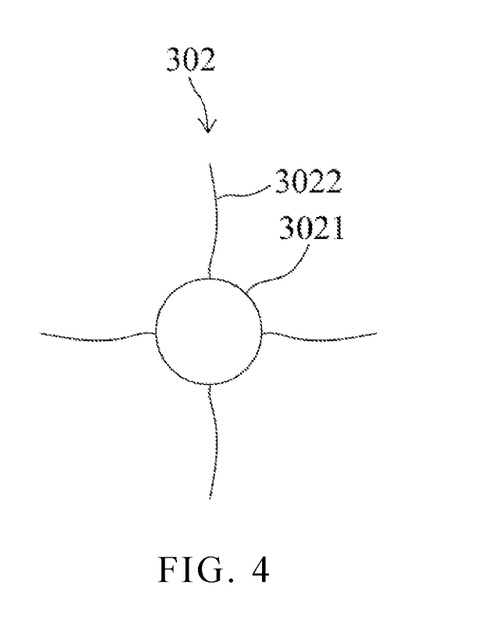
FIG. 4 is a schematic diagram of a nano-particle composite provided by an embodiment of the present disclosure.

Referring to FIG. 4, FIG. 4 is a schematic diagram of the nano-particle composite in an embodiment of the present disclosure. The nano-particle composite 302 includes an inorganic nano-particle 3021 and an organic modifier 3022 including organic chain segments grafted on a surface of the inorganic nano-particle 3021.

In the embodiment, raw materials for preparing the nano-particle composite 302 include the inorganic nano-particle and an organic compound. A surface of the inorganic nano-particle is provided with active hydroxyl groups. The organic compound includes at least one of a titanate coupling agent and a zirconate coupling agent.

In conventional technology, a silane coupling agent is generally used to modify inorganic nano-particles. However, the inventor of the present disclosure has found through creative effort that the use of a great number of the silane coupling agent to modify the inorganic nano-particles significantly reduces the refractive index of a nano-particle composite, and the refractive index of the obtained nano-particle composite is difficult to meet the requirement of a high refractive index for the microstructure.

In view of the above-mentioned defects of the conventional silane coupling agents, through a great number of creative effort, the inventor found that after the titanate coupling agent and the zirconate coupling agent with greater refractive index respectively than a refractive index of the silane coupling agent reacts with the active hydroxyl groups of the inorganic nano-particle to prepare nano-particle composite 302, the prepared nano-particle composite 302 has a greater refractive index, which can ensure that the microstructure 301 of the light condensing layer prepared by the photocurable composition has a greater refractive index, so as to meet the requirement of high refractive index for the microstructure 301, further improve the light output rate of the display device, and further improve the display brightness of the display device at the positive viewing angle and the viewing angle deviating from the positive viewing angle within a certain range.

In addition, the inventor also found that although a difference between the refractive index of the silane coupling agent and the refractive index of the titanate coupling agent, and a difference between the refractive index of the silane coupling agents and the refractive index of the zirconate coupling agent are both small, when the silane coupling agent, the titanate coupling agent, and the zirconate coupling agent are used as raw materials of the nano-particle composite 302 to prepare the microstructure 301 of the light condensing layer, a difference of display brightness of the display device caused by the difference of refractive index cannot be ignored. Specifically, when the titanate coupling agent and the zirconate coupling agent are used as the raw materials of the nano-particle composite 302 to be applied to the microstructure 301 of the light condensing layer, compared with using the silane coupling agent as raw materials of the nano-particle composite 302 to be applied to a preparation of the microstructure 301 of the light condensing layer, the display brightness of the display device at a positive viewing angle and a viewing angle deviating from the positive viewing angle within a certain range can be significantly improved. In other words, the titanate coupling agent and the zirconate coupling agent are used as the raw materials of the nano-particle composite 302 to be applied to the preparation of the microstructure 301 of the light condensing layer, and the light condensing layer is applied to the display device, brightness of the display device at a positive viewing angle and a viewing angle deviating from the positive viewing angle within a certain range can be improved, which is not a simple replacement of the silane coupling agent, nor a conventional choice.

Furthermore, since the nano-particle composite 302 of the present disclosure includes the organic chain segments, spatial steric resistance of the nano-particle composite 302 increases, and an agglomeration problem of the inorganic nano-particles can be improved, the nano-particle composite 302 can be more evenly dispersed in the acrylic resin, which can reduce a scattering effect of the inorganic nano-particles in the microstructure on light emitted by the display units, thus ensuring a focusing effect of the light condensing layer 3 on the light emitted by the display units. The light output rate of the display device can be further improved, and the display brightness of the display device at the positive viewing angle and the viewing angle deviating from the positive viewing angle within a certain range can be further improved.

In the embodiment, a ratio of a mass of the inorganic nano-particle to a mass of the organic compound is (1 to 2):(0.1 to 5), to ensure that a proportion of the organic modifier 3022 in the nano-particle composite 302 is appropriate, so as to ensure that the nano-particle composite 302 can be evenly dispersed in the acrylic resin, and at the same time ensure that the nano-particle composite 302 has a high refractive index.

It can be understood that the ratio of the mass of the inorganic nano-particle to the mass of the organic compound may be (1 to 2):(0.5 to 4.5), (1 to 2):(1 to 3), (1 to 2):(1.5 to 2.5), or (1 to 2):(1.8 to 2).

It should be noted that since the refractive index of the inorganic nano-particle is greater than the refractive index of the organic compound, compatibility between organic chain segments in the organic compound and the acrylic resin is better than compatibility between the inorganic nano-particle and the acrylic resin. In the raw materials for preparing the nano-particle composite 302, the greater the mass of the organic compound is, the less the refractive index of the nano-particle composite 302 is, but dispersion and uniformity of the nano-particle composite 302 in the acrylic resin is better; the less the mass of the organic compound is, the greater the refractive index of the nano-particle composite 302 is, but the dispersion and the uniformity of the nano-particle composite 302 in the acrylic resin is worse.

In the embodiment, a particle diameter of the inorganic nano-particle 3021 is less than or equal to 100 nm, so that the particle diameter of the inorganic nano-particle 3021 is far less than a wavelength of visible light, which can improve the refractive index of the microstructure 301, and at the same time, avoid scattering the light emitted by the display units 20 due to a too large particle diameter of the inorganic nano-particle 3021.

Further, the particle diameter of the inorganic nano-particle 3021 is greater than or equal to 20 nm and less than or equal to 80 nm, so as to avoid that the particle diameter of the inorganic nano-particle 3021 is too small and easy to agglomerate and float.

For example, the particle diameter of the inorganic nano-particle 3021 may be 25 nm, 30 nm, 35 nm, 40 nm, 45 nm, 50 nm, 60 nm, 70 nm, 80 nm, or 90 nm.

In the embodiment, the refractive index of the inorganic nano-particle 3021 is greater than or equal to 1.8, so that the nano-particle composite 302 has a high refractive index, thereby improving the refractive index of the microstructure 301. Light emitted by the display unit 20 has a higher light output rate after passing through the microstructure 301, which can further improve the display brightness of the display device 100 at the positive viewing angle and the viewing angle deviating from the positive viewing angle within a certain range.

In the embodiment, the inorganic nano-particle 3021 includes at least one of titanium oxide ($TiO_2$), zirconium dioxide ($ZrO_2$), and magnesium oxide (MgO), so that the inorganic nano-particle 3021 has a high refractive index, and at the same time, surfaces of the raw materials for preparing the inorganic nano-particle 3021 have the active hydroxyl groups that can participate in reaction. Specifically, the inorganic nano-particles 3021 include titanium oxide.

It should be noted that compared with the inorganic nano-particle 3021 which is silicon dioxide, the inorganic nano-particle 3021 has a higher refractive index when it is titanium oxide, zirconium dioxide, or magnesium oxide, which can make the microstructure 301 have a higher refractive index.

In the embodiment, the organic compound is represented by a formula of $(R_1O)_nM(OCOR_2)_{4-n}$, wherein n is greater than or equal to 1 and is less than or equal to 3, $R_1$ independently at each occurrence represents an alkyl group, at least one $R_2$ includes at least one of a carbon-carbon double bond, an amino group, and a mercapto group, and M is Ti or Zr.

The alkyl group is a $C_1$-$C_6$ alkyl group. For example, the alkyl group includes but is not limited to a methyl group, an ethyl group, a propyl group, or an isopropyl group.

Figure 5:
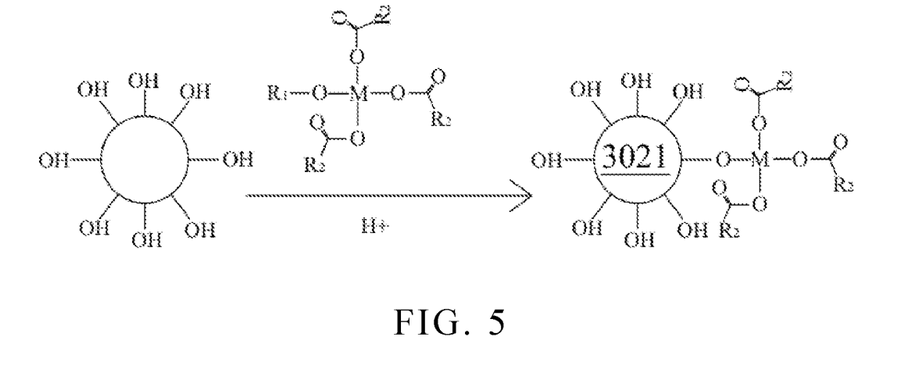
FIG. 5 is a schematic diagram of an inorganic nano-particle reacting with an organic compound to form the nano-particle composite under an acidic condition when n is equal to 1.

Specifically, in the embodiment, n is equal to 1. As shown in FIG. 5, FIG. 5 is a schematic diagram of the inorganic nano-particle reacting with the organic compound to form the nano-particle composite under an acidic condition when n is equal to 1. Under the acidic condition, a $R_1O$ group of the organic compound reacts with the active hydroxyl groups on the surface of the inorganic nano-particle under the acidic condition to obtain the nano-particle composite 302. The organic modifier 3022 of the nano-particle composite 302 includes three $R_2$ groups. Understandably, the n may be equal to 2 or 3.

It should be noted that the less the n is, the more functional groups in each organic compound react with the acrylic resin, and the fewer $R_1O$ groups reacts with the active hydroxyl groups of the inorganic nano-particle; the greater the n is, the fewer functional groups in each organic compound react with the acrylic resin, and the more $R_1O$ groups reacts with the active hydroxyl groups of the inorganic nano-particle.

In addition, compared with a difficult reaction between the epoxy group and the acrylic resin, a carbon-carbon double bond, a mercapto group, and an amino group are all easier to react with a carbon-carbon double bond of the acrylic resin. In processes of cross-linking and curing of the acrylic resin, $R_2$ groups of the nano-particle composite 302 may be react with the acrylic resin, thus making the inorganic nano-particle link to the cured polymer through organic chain segments, further improving dispersion of the inorganic nano-particle in the cured polymer, and further improving a floating problem of the inorganic nano-particle.

In the embodiment, the titanate coupling agent includes, but is not limited to, isopropyl trioleyl titanate, isopropoxy tri (ethylenediamino-N-ethoxy) titanate, and isopropoxy tri (3-mercaptopropionic acid) titanate. The zirconate coupling agent includes, but is not limited to, dialkyloxy bis (4-aminobenzoyl) zirconate.

In the embodiment, a ratio of a mass of the acrylic resin to a mass of the nano-particle composite 302 is (3 to 20):(1 to 10), so that the microstructure 301 has a high refractive index while ensuring physical and mechanical properties of the microstructure 301.

It can be understood that the ratio of the mass of the acrylic resin to the mass of the nano-particle composite 302 is (4 to 18):(2 to 9), (5 to 15):(3 to 7), or (6 to 12):(4 to 7).

It should be noted that the more nano-particle composites 302 are, the more beneficial it is to improve the refractive index of the microstructure 301, but it may adversely affect wear resistance and hardness of the microstructure 301. On the contrary, the fewer the nano-particle composites 302 are, the less the refractive index of the microstructure 301 is.

In the embodiment, the photocurable composition further includes a refractive index regulating monomer. A refractive index of the refractive index regulating monomer is greater than the refractive index of the acrylic resin, which can improve the refractive index of the microstructure 301, and at the same time, poor hardness and wear resistance of the nano-particle composite 302 caused by improving the refractive index of the nano-particle composite 302 can be improved.

The refractive index regulating monomer includes at least one of 2-acrylic acid 2-([1,1'-biphenyl]-2-oxy) ethyl ester (OPPEA), 9,9-bis [4-(2-acryloyloxy) phenyl]fluorene diacrylate (BPEFDA), acrylic acid 2-phenoxy ethyl ester (PEA), and tetraphenyl methacrylate (BPMA).

It should be noted that a chemical crosslinking reaction may occur between a carbon-carbon double bond of the refractive index regulating monomer and the $R_2$ group of the nano-particle composite 302. For example, when the $R_2$ group includes a carbon-carbon double bond, a free radical polymerization reaction may occur between the carbon-carbon double bond of the $R_2$ group and the carbon-carbon double bond of the refractive index regulating monomer. Therefore, a polymer network formed after polymerization of the acrylic resin and the refractive index regulating monomer is bridged with the inorganic nano-particle through organic chain segments.

In the embodiment, a ratio of the mass of the acrylic resin to a mass of the refractive index regulating monomer is (3 to 20):(3 to 15), so as to improve the refractive index of the microstructure 301, and at the same time, to improve hardness and poor wear resistance of the nano-particle composite 302 caused by improving the refractive index of the nano-particle composite 302.

It can be understood that the ratio of the mass of the acrylic resin to the mass of the refractive index regulating monomer may be (4 to 18):(4 to 13), (6 to 15):(5 to 12), or (8 to 12):(7 to 10).

In the embodiment, the photocurable composition further includes an antifouling additive. The antifouling additive is configured to improve an antifouling performance of the microstructure 301.

The antifouling additive include at least one of QHL-1030 of Shanghai Qihe Chemical, KY1203 of Xinyue, KF-6002 of Xinyue, C1604 of Taicang Sinochem, BYK3700 of Biochem, and TEGO 5000N of Digao. The antifouling additive may be common antifouling agents.

In the embodiment, a ratio of the acrylic resin, the antifouling additive, and the photoinitiator is (3 to 20):(0.1 to 1):(0.3 to 2) by mass.

In the embodiment, the photocurable composition may further include a solvent. The solvent can dissolve the acrylic resin and the refractive index regulating monomer, reduce viscosity of the photocurable composition, and improve process manufacturability of the microstructure 301.

The solvent includes at least one of ethyl acetate, methyl isobutyl ketone, propylene glycol methyl ether acetate, cyclohexanone, butyl acetate, and N-methyl pyrrolidone.

Specifically, in the embodiment, calculated by weight percentage, the photocurable composition includes following components within certain ranges: 3.0% to 20.0% of the acrylic resin, 3.0% to 15.0% of the refractive index regulating monomer, 53% to 90% of the solvent, 0.3% to 2% of the photoinitiator, and 1% to 10% of the nano-particle composite.

In the embodiment, a manufacturing method of the microstructure layer 30 of the display device includes following steps:
dissolving the acrylic resin, the refractive index regulating monomer, the photoinitiator, and the nano-particle composite in the solvent to obtain a first transparent mixed solution;
filming the first transparent mixed solution on the light output surface of the display panel, and then removing the solvent to obtain a film layer to be patterned;
patterning the film layer to be patterned to obtain a microstructure to be cured; and
curing the microstructure to be cured by ultraviolet irradiation to obtain the microstructure layer 30 of the display panel, the microstructure layer 30 includes a plurality of microstructures 301.

In the embodiment, the step of dissolving the acrylic resin, the refractive index regulating monomer, the photoinitiator, and the nano-particle composite in the solvent includes following steps:
dissolving the photocurable acrylic resin and the refractive index regulating monomer in the solvent to obtain a monomer dispersion; and
dissolving the photoinitiator in the monomer dispersion, adding a dispersion of the nano-particle composite into the monomer dispersion, and stirring to obtain the first transparent mixed solution.

In the embodiment, the step of patterning the film layer to be patterned includes a following step:

pressing a light transmitting mold with an invaginated structure on the film layer to be patterned to pattern the film layer to be patterned; the invaginated structure corresponds to the display units of the display panel.

It should be noted that the invaginated structure and the microstructure are complementary, and the invaginated structure and the microstructure can occlude each other.

In the embodiment, the manufacturing method of the microstructure layer 30 further includes a following step:

removing the light transmitting mold after curing the microstructure to be cured by ultraviolet irradiation.

In the embodiment, a preparation method of the dispersion of the nano-particle composite includes following steps:

dispersing the inorganic nano-particles in an alcohol solvent to obtain an inorganic nano-particle dispersion;

adding the organic compound into the inorganic nano-particle dispersion, and then adding an acid catalyst, heating the reaction solution to a temperature of 30° C. to 100° C. in a protective atmosphere, to obtain a second transparent mixed solution; and cooling the second transparent mixed solution to a temperature of 20° C. to 28° C., and stirring to obtain the dispersion of the nano-particle composite.

In the embodiment, the inorganic nano-particle dispersion is a milky white solution, and the dispersion of the nano-particle composite is a light yellow transparent liquid.

In the embodiment, the alcohol solvent includes at least one of ethanol, propanol, isopropanol, and polyethylene glycol methacrylate.

In the embodiment, a ratio of a mass of inorganic nano-particle to a volume of the alcohol solvent is (1 to 2) g:(7 to 13) mL.

In the embodiment, the step of dispersing the inorganic nano-particle in the alcohol solvent includes a following step:

adding the inorganic nano-particle into the alcohol solvent for ultrasonic treatment.

A time of the ultrasonic treatment is greater than or equal to 20 minutes and less than or equal to 30 minutes.

In the embodiment, the acid catalyst includes but is not limited to glacial acetic acid. A gas in the protective atmosphere includes but is not limited to nitrogen (He) and argon (Ar).

In the embodiment, the refractive index of the light transmitting covering layer 40 is greater than 1 and less than 1.5, so that the refractive index of the light transmitting covering layer 40 is between the refractive index of the microstructure 301 and the refractive index of air.

Further, the refractive index of the light transmitting covering layer 40 is greater than 1 and less than 1.2.

For example, the refractive index of the light transmitting covering layer 40 is 1.1, 1.2, 1.3, 1.4, or 1.5.

In the embodiment, a surface of the light transmitting covering layer 40 away from the display panel 101 is flat.

In the embodiment, the light transmitting covering layer 40 includes an organic layer. A material of the light transmitting covering layer 40 includes organic silicon.

Figure 6:
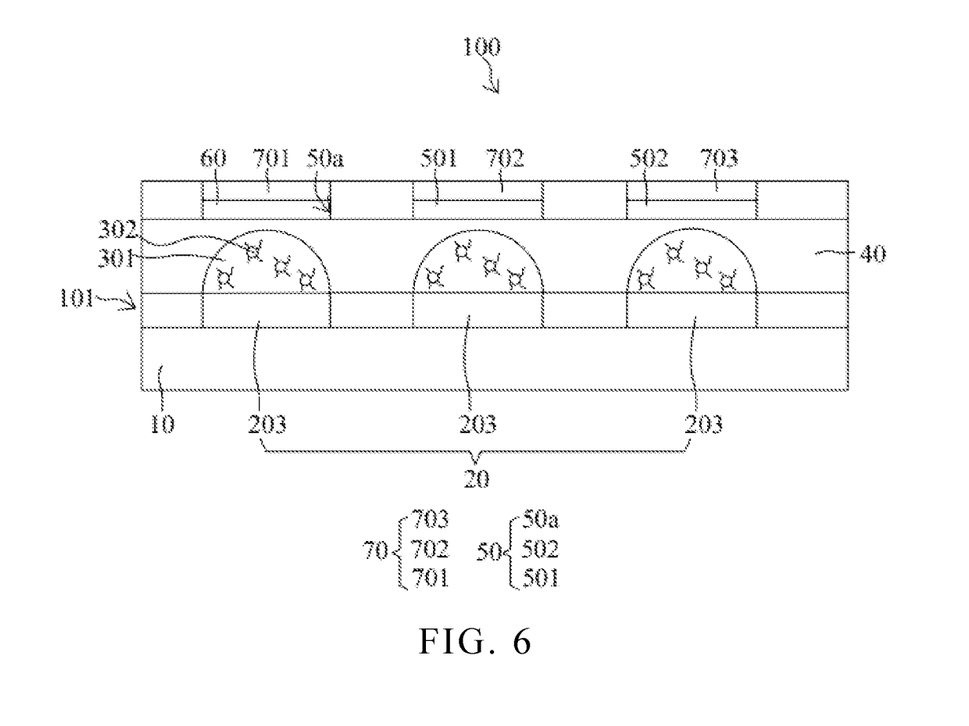
FIG. 6 is a schematic sectional diagram of a display device provided by another embodiment of the present disclosure.

Referring to FIG. 6, FIG. 6 is a schematic sectional diagram of a display device provided by another embodiment of the present disclosure. The display device 100 shown in FIG. 6 is basically similar to the display device 100 shown in FIG. 1, and the similarities will not be repeated. Differences include that the plurality of the display units 20 all emit a first color light with a same color, the display device 100 further includes a color conversion layer 50, the color conversion layer 50 is located at a side of the light condensing layer 3 away from the display panel 101, and the color conversion layer 50 further includes a first color conversion unit 501, a second color conversion unit 502, and a blank area 50a disposed adjacent to each other; the blank area 50a is not provided with a color conversion unit, the adjacent first color conversion unit 501, the second color conversion unit 502, and the blank area 50a overlap with three display units 20 respectively; the first color conversion unit 501 is configured to convert the first color light into a second color light, the second color conversion unit 502 is configured to convert the first color light into a third color light, colors of the first color light, the second color light, and the third color light are different from each other.

Specifically, the color conversion layer 50 is located on a surface of the light transmitting covering layer 40 away from the display panel 101. The first color light is blue light, the second color light is red light, and the third color light is green light.

In the embodiment, the display device 100 further includes a transparent filling unit 60. The transparent filling unit 60 is filled in the blank area 50a. The transparent filling unit 60 includes a transparent organic material.

In the embodiment, the display device 100 further includes a light filtering layer 70. The light filtering layer 70 is located on a side of the color conversion layer 50 away from the display panel 101. The light filtering layer 70 includes a first color resistance unit 701, a second color resistance unit 702, and a third color resistance unit 703. The first color resistance unit 701 overlaps with the blank area 50a, and a color of light filtered by the first color resistance unit 701 is the same as the first color light. The second color resistance unit 702 overlaps with the first color conversion unit 501, and a color of light filtered by the second color resistance unit 702 is the same as the second color light. The third color resistance unit 703 overlaps with the second color conversion unit 502, and a color of light filtered by the third color resistance unit 703 is the same as the third color light.

In the embodiment, both the first color conversion unit 501 and the second color conversion unit 502 include quantum dots.

The light condensing layer of the display device in the embodiment is located between the display panel and the color conversion layer. After the light condensing layer gathers a part of light emitted by the display panel, the light is converted into light with different colors through the color conversion layer, which improves the display brightness of the display device at a positive viewing angle and at a viewing angle deviating from the positive viewing angle within a certain range, and improves a crosstalk problem between light of different colors.

Figure 7:
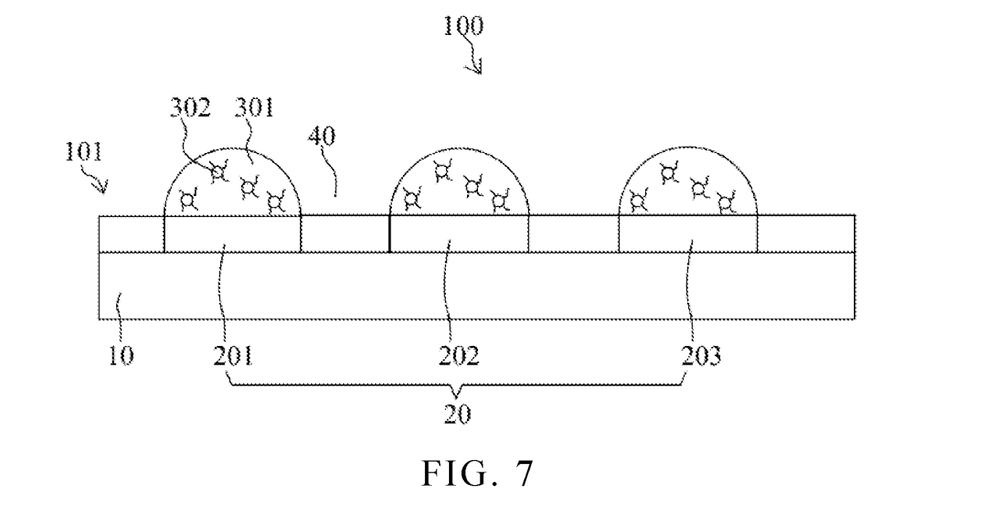
FIG. 7 is a schematic sectional diagram of a display device provided by another embodiment of the present disclosure.

Referring to FIG. 7, FIG. 7 is a schematic sectional diagram of a display device provided by another embodiment of the present disclosure. The display device 100 shown in FIG. 7 is basically similar to the display device 100 shown in FIG. 1, and the similarities will not be repeated. Differences include that the light condensing layer 3 is located at an outermost side of the display device 100, and the light transmitting covering layer 40 is an air layer.

In the embodiment, due to a difference between the refractive index of the plurality of microstructures 301 of the microstructure layer 30 and the refractive index of air, the light condensing layer 3 can gather light emitted by the display panel 101, thereby improving the display brightness of the display device at a positive viewing angle and at a viewing angle deviating from the positive viewing angle within a certain range.

The following verifies performances of the photocurable composition for preparing the microstructure layer in combination with a high refractive index layer.

Example 1

The example 1 provides a preparation method of a dispersion of the nano-particle composite, including following steps:

1 g of titanium oxide with a particle diameter of 20 nm to 50 nm and 7 mL of isopropanol were mixed into a three necked flask, then the solution was dispersed under ultrasound for 20 minutes to obtain a milky inorganic nano-particle dispersion;

0.5 g of isopropyl trioleic acid acyloxy titanate was added into the inorganic nano-particle dispersion, and the dispersion was fully mixed, then 0.2 mL of glacial acetic acid was dropped as the catalyst, the three necked bottle was placed in a vacuum atmosphere, nitrogen was injected into the three necked bottle to form the protective atmosphere, and then the dispersion was heated to a temperature of 80° C. to obtain a transparent mixed solution; and the transparent mixed solution was cooled to a room temperature, the solution was stirred for 5 minutes, and then stop stirring it to obtain a light yellow transparent dispersion of the nano-particle composite, then the light yellow transparent dispersion was transferred for standby, and was labeled as NP-1.

Examples 2 to 4

Example 2 is basically similar to the example 1, a difference is that the alcohol solvent in the example 2 was polyethylene glycol methacrylate, and a dispersion of the nano-particle composite prepared in the example 2 was labeled as NP-2.

Example 3 is basically similar to the example 1, a difference is that the organic compound in the example 3 was isopropoxytri (ethylenediamino-N-ethoxy) titanate, and a dispersion of the nano-particle composite prepared in the example 3 was labeled as NP-3.

Example 4 is basically similar to the example 1, a difference is that the organic compound in the example 4 was isopropoxy tri (3-mercaptopropionic acid) titanate, and a dispersion of the nano-particle composite prepared in the example 4 was labeled as NP-4.

Example 5

The example 5 provides a preparation method of a dispersion of the nano-particle composite, including following steps:

2 g of titanium oxide with a particle diameter of 20 nm to 50 nm and 13 mL polyethylene glycol methacrylate were mixed into a three necked flask, then the solution was dispersed under ultrasound for 30 minutes to obtain a milky inorganic nano-particle dispersion;

5 g of isopropoxytri (3-mercaptopropionic acid) titanate was added into the inorganic nano-particle dispersion, and the dispersion was fully mixed, then 0.2 mL of glacial acetic acid was dropped as the catalyst, the three necked bottle was in a vacuum atmosphere, nitrogen was injected into the three necked bottle to form the protective atmosphere, and then the dispersion was heated to a temperature of 65° C. to obtain a transparent mixed solution; and the transparent mixed solution was cooled to a room temperature, the solution was stirred for 10 minutes, and then stop stirring it to obtain a light yellow transparent dispersion of the nano-particle composite, then the light yellow transparent dispersion was transferred for standby, and was labeled as NP-5.

Examples 6 to 12, Comparative Example 1, and Comparative Example 2

The examples 6 to 12, the comparative example 1, and the comparative example 2 all provide preparation methods of high refractive index layers, including following steps:

a component A and a component B were dissolved into a component C to obtain a first mixed solution;

a component D and a component E were dissolved into the first mixed solution to obtain a second mixed solution;

a component F was dissolved into the second mixed solution to obtain a third mixed solution; and the third mixed solution was spun on a glass substrate, the solvent was removed, and then the solution was cured by ultraviolet light to obtain a high refractive index layer.

Components A to F in the examples 6 to 12, the comparative example 1, and the comparative example 2 are shown in table 1. A preparation method of NP'-2 in the comparative example 2 is basically similar to the preparation method of the NP1 in the example 1, with a difference that 0.5 g of isopropyl trioleic oxytitanate is replaced by 0.5 g of γ-aminoethylaminopropyltrimethoxysilane.

TABLE 1

| | Component | | | | | |
|---|---|---|---|---|---|---|
| | A<br>Acrylic resin | B<br>Refractive index regulating monomer | C<br>Solvent | D<br>Photoinitiator | E<br>Antifouling additive | F<br>Dispersion of the nano-particle composite |
| Example 6 | 20 g of ditrimethylolpropane tetraacrylate | 10 g of 2-phenoxyethyl acrylate | 59 g of ethyl acetate | 2 g of 2-Hydroxy-2-methyl-1-phenyl-1-acetone | 1 g of QHL-1030 | 8 g of NP1 |
| Example 7 | 20 g of ditrimethylolpropane tetraacrylate | 10 g of 2-phenoxyethyl acrylate | 59 g of ethyl acetate | 2 g of 2-Hydroxy-2-methyl-1-phenyl-1-acetone | 1 g of QHL-1030 | 8 g of NP2 |
| Example 8 | 20 g of ditrimethylolpropane tetraacrylate | 10 g of 2-phenoxyethyl acrylate | 45 g of ethyl acetate | 2 g of 2-Hydroxy-2-methyl-1-phenyl-1-acetone | 1 g of QHL-1030 | 22 g of NP5 |

TABLE 1-continued

| | A Acrylic resin | B Refractive index regulating monomer | C Solvent | D Photoinitiator | E Antifouling additive | F Dispersion of the nano-particle composite |
|---|---|---|---|---|---|---|
| Example 9 | 5 g of ditrimethylolpropane tetraacrylate | 15 g of 2-phenoxyethyl acrylate | 69 g of ethyl acetate | 2 g of 2-Hydroxy-2-methyl-1-phenyl-1-acetone | 1 g of QHL-1030 | 8 g of NP1 |
| Example 10 | 12 g of ditrimethylolpropane tetraacrylate | 10 g of 2-phenoxyethyl acrylate | 67 g of ethyl acetate | 2 g of 2-Hydroxy-2-methyl-1-phenyl-1-acetone | 1 g of QHL-1030 | 8 g of NP1 |
| Example 11 | 20 g of ditrimethylolpropane tetraacrylate | 10 g of 2-phenoxyethyl acrylate | 59 g of ethyl acetate | 2 g of 2-Hydroxy-2-methyl-1-phenyl-1-acetone | 1 g of QHL-1030 | 8 g of NP3 |
| Example 12 | 20 g of ditrimethylolpropane tetraacrylate | 10 g of 2-phenoxyethyl acrylate | 59 g of ethyl acetate | 2 g of 2-Hydroxy-2-methyl-1-phenyl-1-acetone | 1 g of QHL-1030 | 8 g of NP4 |
| Comparative Example 1 | 20 g of ditrimethylolpropane tetraacrylate | 10 g of 2-phenoxyethyl acrylate | 66 g of ethyl acetate | 2 g of 2-Hydroxy-2-methyl-1-phenyl-1-acetone | 1 g of QHL-1030 | 1 g of unmodified titanium dioxide |
| Comparative Example 2 | 20 g of ditrimethylolpropane tetraacrylate | 10 g of 2-phenoxyethyl acrylate | 66 g of ethyl acetate | 2 g of 2-Hydroxy-2-methyl-1-phenyl-1-acetone | 1 g of QHL-1030 | 8 g of NP'-2 |

Dispersion states of the inorganic nano-particles, the refractive index, pencil hardness, and haze of the high refractive index layers in the examples 6 to 12, the comparative example 1, and the comparative example 2 are shown in table 2.

TABLE 2

| | Dispersion state of the inorganic nano-particle | Refractive index | Pencil hardness (H) | Haze (%) | Water-drop angle |
|---|---|---|---|---|---|
| Example 6 | Fewer inorganic nano-particles are located on the surface, and the inorganic nano-particles are uniformly dispersed | 1.68 | 3 | 0.82 | 110° |
| Example 7 | | 1.67 | 2 | 0.81 | 110° |
| Example 8 | | 1.64 | 4 | 0.9 | 110° |
| Example 9 | | 1.8 | 3 | 0.83 | 110° |
| Example 10 | | 1.75 | 3 | 0.82 | 110° |
| Example 11 | | 1.69 | 3 | 0.81 | 110° |
| Example 12 | | 1.67 | 3 | 0.81 | 110° |
| Comparative Example 1 | More inorganic nano-particles are located on the surface, and the inorganic nano-particles are agglomerated | 1.67 | 2 | 1.2 | 110° |
| Comparative Example 2 | Fewer inorganic nano-particles are located on the surface, and the inorganic nano-particles are uniformly dispersed | 1.62 | 2 | 0.81 | 110° |

According to table 2, fewer inorganic nano-particles are located on the surface of the high refractive index layer in the examples 6 to 12 of the present disclosure, and the inorganic nano-particles are uniformly dispersed in the high refractive index layer. In comparative example 1, more inorganic nano-particles are located on the surface of the high refractive index layer, which causes a problem of floating up and agglomeration of the inorganic nano-particles. Moreover, the refractive index of the high refractive index layers in examples 6 to 12 of the present disclosure is greater than a refractive index of the high refractive index layer in comparative example 2.

In addition, pencil hardness of the high refractive index layers in the examples 6 to 12 of the present disclosure is greater than or equal to 2 H. Hazes of the high refractive index layers in the examples 6 to 12 of the present disclosure is less than a haze of the high refractive index layer in comparative example 1, and is less than 1%. Water-drop angles of the high refractive index layer in the examples 6 to 12 of the present disclosure is greater than or equal to 110°.

Therefore, the photocurable composition for preparing the high refractive index layer in the example of the present disclosure can improve the agglomeration and floating of the inorganic nano-particles, improve the refractive index of the high refractive index layer, ensure better hardness and wear resistance of the high refractive index layer, and further improve transparency and antifouling performance.

The description of the above embodiments is only used to help understand the technical solutions and a core idea of the present disclosure. Those skilled in the art should understand that they can still modify the technical solutions recorded in the aforementioned embodiments, or equivalent replace some of the technical features; However, these modifications or substitutions do not make a nature of the corresponding technical solutions separate from a scope of the technical solutions of the embodiments of the present disclosure.

What is claimed is:

1. A photocurable composition, wherein the photocurable composition comprises:
   an acrylic resin;
   a photoinitiator; and
   a nano-particle composite, wherein raw materials for preparing the nano-particle composite comprise:
      an inorganic nano-particle, wherein a surface of the inorganic nano-particle is provided with active hydroxyl groups; and
      an organic compound, wherein the organic compound comprises at least one of a titanate coupling agent and a zirconate coupling agent;
         wherein the organic compound for preparing the nano-particle composite is represented by a formula of $(R_1O)_nM(OCOR_2)_{4-n}$, wherein n is greater than or equal to 1 and is less than or equal to 3, $R_1$ independently at each occurrence represents an alkyl group, at least one $R_2$ comprises at least one of a carbon-carbon double bond, an amino group, and a mercapto group, and M is Ti or Zr; and a $R_1O$ group in the formula is capable of reacting with the active hydroxyl groups on the surface of the inorganic nano-particle to obtain the nano-particle composite.

2. The photocurable composition of claim 1, wherein a ratio of a mass of the inorganic nano-particle to a mass of the organic compound is (1 to 2):(0.1 to 5).

3. The photocurable composition of claim 1, wherein the alkyl group is selected from a methyl group, an ethyl group, a propyl group, or an isopropyl group.

4. The photocurable composition of claim 1, wherein the organic compound comprises at least one of isopropyl trioleyl titanate, isopropoxy tri (ethylenediamino-N-ethoxy) titanate, isopropoxy tri (3-mercaptopropionic acid) titanate, and dialkyloxy bis (4-aminobenzoyl) zirconate.

5. The photocurable composition of claim 1, wherein a ratio of a mass of the acrylic resin to a mass of the nano-particle composite is (3 to 20):(1 to 10).

6. The photocurable composition of claim 1, wherein the photocurable composition further comprises:
   a refractive index regulating monomer, wherein a refractive index of the refractive index regulating monomer is greater than a refractive index of the acrylic resin, and a ratio of a mass of the acrylic resin to a mass of the refractive index regulating monomer is (3 to 20):(3 to 15).

7. The photocurable composition of claim 6, wherein the refractive index regulating monomer comprises at least one of 2-acrylic acid 2-([1,1'-biphenyl]-2-oxy) ethyl ester, 9,9-bis [4-(2-acryloyloxy) phenyl] fluorene diacrylate, acrylic acid 2-phenoxy ethyl ester, and tetraphenyl methacrylate.

8. The photocurable composition of claim 1, wherein the photocurable composition further comprises an antifouling additive, and a ratio of the acrylic resin, the antifouling additive, and the photoinitiator is (3 to 20):(0.1 to 1):(0.3 to 2) by mass.

9. The photocurable composition of claim 1, wherein the inorganic nano-particle comprises at least one of titanium dioxide, zirconium dioxide, and magnesium oxide.

10. A light condensing layer, wherein the light condensing layer comprises:
    a microstructure layer, wherein the microstructure layer comprises microstructures, and the microstructure layer is prepared from photocurable compositions; and
    a light transmitting covering layer, wherein the light transmitting covering layer covers the microstructures, and a refractive index of the light transmitting covering layer is less than a refractive index of the microstructure layer;
    wherein each of the photocurable compositions comprises an acrylic resin, a photoinitiator, and a nano-particle composite, raw materials for preparing the nano-particle composite comprise an inorganic nano-particle and an organic compound, a surface of the inorganic nano-particle is provided with active hydroxyl groups, and the organic compound comprises at least one of a titanate coupling agent and a zirconate coupling agent;
    wherein the organic compound for preparing the nano-particle composite is represented by a formula of $(R_1O)_nM(OCOR_2)_{4-n}$, wherein n is greater than or equal to 1 and is less than or equal to 3, $R_1$ independently at each occurrence represents an alkyl group, at least one $R_2$ comprises at least one of a carbon-carbon double bond, an amino group, and a mercapto group, and M is Ti or Zr; and a $R_1O$ group in the formula is capable of reacting with the active hydroxyl groups on the surface of the inorganic nano-particle to obtain the nano-particle composite.

11. The light condensing layer of claim 10, wherein the light transmitting covering layer comprises an organic layer.

12. The light condensing layer of claim 10, wherein the light transmitting covering layer is an air layer.

13. The light condensing layer of claim 10, wherein a cross-sectional shape of the microstructure comprises at least one of a semicircle, a triangle, and a trapezoid in a thickness direction of the light condensing layer.

14. The light condensing layer of claim 10, wherein a ratio of a mass of the inorganic nano-particle to a mass of the organic compound is (1 to 2):(0.1 to 5).

15. The light condensing layer of claim 10, wherein a ratio of a mass of the acrylic resin to a mass of the nano-particle composite is (3 to 20):(1 to 10).

16. The light condensing layer of claim 10, wherein the photocurable composition further comprises a refractive index regulating monomer, a refractive index of the refractive index regulating monomer is greater than a refractive index of the acrylic resin, and a ratio of a mass of the acrylic resin to a mass of the refractive index regulating monomer is (3 to 20):(3 to 15).

17. A display device, wherein the display device comprises:
    a display panel, the display panel comprising display units; and
    a light condensing layer, wherein the light condensing layer is located on a light output side of the display panel, the light condensing layer comprises a microstructure layer and a light transmitting covering layer, the microstructure layer comprises microstructures, and the microstructure layer is prepared from photocurable compositions; the light transmitting covering layer covers the microstructures, and a refractive index of the light transmitting covering layer is less than a refractive index of the microstructure layer, a part of the light transmitting covering layer covering the microstructures is located on a side of the microstructures away from the display panel, and the microstructures overlap the display units;
    wherein each of the photocurable compositions comprises an acrylic resin, a photoinitiator, and a nano-particle composite, raw materials for preparing the nano-particle composite comprise an inorganic nano-particle and an organic compound, a surface of the inorganic nano-particle is provided with active hydroxyl groups, and the organic compound comprises at least one of a titanate coupling agent and a zirconate coupling agent;

wherein the organic compound for preparing the nano-particle composite is represented by a formula of $(R_1O)_nM(OCOR_2)_{4-n}$, wherein n is greater than or equal to 1 and is less than or equal to 3, $R_1$ independently at each occurrence represents an alkyl group, at least one $R_2$ comprises at least one of a carbon-carbon double bond, an amino group, and a mercapto group, and M is Ti or Zr; and a RIO group in the formula is capable of reacting with the active hydroxyl groups on the surface of the inorganic nano-particle to obtain the nano-particle composite.

18. The display device of claim 17, wherein a ratio of a mass of the inorganic nano-particle to a mass of the organic compound is (1 to 2):(0.1 to 5).

19. The display device of claim 17, wherein the microstructure layer comprises a plurality of the microstructures arranged in an array, and a gap is defined between adjacent two of the microstructures.

20. The display device of claim 17, wherein a bottom surface of the microstructure is disposed facing the display units, the bottom surface of the microstructure is connected to an inclined sidewall of the microstructure, and an angle defined between the bottom surface of the microstructure and the inclined sidewall of the microstructure is greater than 0° and less than 90°.

* * * * *